US012363091B2

(12) United States Patent
Smolny et al.

(10) Patent No.: US 12,363,091 B2
(45) Date of Patent: Jul. 15, 2025

(54) METHOD FOR AUTHENTICATION WITH IDENTITY PROVIDERS

(71) Applicant: International Business Machines Corporation, Armonk, NY (US)

(72) Inventors: Martin Smolny, Boeblingen (DE); Thomas Dürr, Magstadt (DE); Michael Beck, Bad Teinach-Zavelstein (DE); Georg Ochs, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 16/575,438

(22) Filed: Sep. 19, 2019

(65) Prior Publication Data
US 2020/0153814 A1 May 14, 2020

(30) Foreign Application Priority Data
Nov. 8, 2018 (EP) .................... 18205136

(51) Int. Cl.
*H04L 9/40* (2022.01)
(52) U.S. Cl.
CPC ........ *H04L 63/0815* (2013.01); *H04L 63/062* (2013.01); *H04L 63/083* (2013.01); *H04L 63/102* (2013.01); *H04L 63/108* (2013.01)
(58) Field of Classification Search
CPC . H04L 63/0815; H04L 63/083; H04L 63/108; H04L 63/102; H04L 63/062; H04L 63/0807; H04L 9/3226; H04L 9/0819; H04L 9/3213; H04W 12/069
See application file for complete search history.

(56) References Cited

U.S. PATENT DOCUMENTS

| 8,037,194 | B2 | 10/2011 | Yared et al. |
| 8,881,257 | B2 | 11/2014 | Cha et al. |
| 9,344,419 | B2 | 5/2016 | Ma |
| 2003/0149781 | A1* | 8/2003 | Yared .................. H04L 63/0815 709/228 |

(Continued)

OTHER PUBLICATIONS

Takamichi Saito et al., "An Authorization Scheme Concealing Client's Access from Authentication Server," 2016, pp. 593-598. (Year: 2016).*

(Continued)

*Primary Examiner* — Luu T Pham
*Assistant Examiner* — Canh Le
(74) *Attorney, Agent, or Firm* — Scott Dobson

(57) ABSTRACT

The present disclosure relates to a method for authentication with identity providers via a federating authorization server, wherein the federating authorization server has at least one interface to at least one identity provider. Each identity provider is configured to validate user identities using a respective validation method. The method comprises: receiving login data via a webpage, the login data indicating at least an identity provider and a user. The validation method of the indicated identity provider may be determined using the login data. An update of the content of the webpage may be caused for enabling the determined validation method. Identity information of the user may be provided via the updated webpage and verifying the identity information using the determined validation method.

18 Claims, 7 Drawing Sheets

(56) References Cited

U.S. PATENT DOCUMENTS

| | | | | |
|---|---|---|---|---|
| 2010/0011421 | A1* | 1/2010 | Chari | H04L 63/0815 |
| | | | | 726/5 |
| 2014/0068743 | A1* | 3/2014 | Marcus | G06F 21/33 |
| | | | | 726/8 |
| 2015/0244696 | A1* | 8/2015 | Ma | H04L 67/42 |
| | | | | 726/4 |
| 2017/0026374 | A1 | 1/2017 | Oberheide et al. | |
| 2017/0257358 | A1* | 9/2017 | Ebrahimi | H04L 63/083 |
| 2017/0331832 | A1 | 11/2017 | Ander et al. | |
| 2019/0124089 | A1* | 4/2019 | Schlicher | H04L 63/0853 |
| 2019/0140848 | A1* | 5/2019 | Dontov | H04L 9/3268 |
| 2019/0245848 | A1* | 8/2019 | Divoux | H04L 63/0815 |
| 2020/0099676 | A1* | 3/2020 | Desarda | H04L 63/0815 |

OTHER PUBLICATIONS

Anita Patil, "Implementation of Security Framework for Multiple Web Applications," 2014, pp. 1-7. (Year: 2014)*
"Authorize access to web applications using OpenID Connect and Azure Active Directory", Microsoft Azure, May 21, 2019, 13 pages. https://docs.microsoft.com/en-us/azure/active-directory/develop/v1-protocols-openid-connect-code.
Otto, "Using OpenID Connect to delegate authentication to Oracle Identity Cloud Service", Oracle, A-Team Chronicles, Nov. 10, 2016, 11 pages. http://www.ateam-oracle.com/using openid-connect-to-delegate-authentic . . . .
"OpenID Connect Core 1.0 incorporating errata set 1", OpenID, printed Aug. 26, 2019, 91 pages. https://openid.net/specs/openid-connect-core-1_0.html.
M'Raihi et al., "TOTP: Time-Based One-Time Password Algorithm", Internet Engineering Task Force (IETF), May 2011, ISSN: 2070-1721, 17 pages. https://tools.ietf.org/html/rfc6238.
Hardt, "The OAuth 2.0 Authorization Framework", Internet Engineering Task Force (IETF), Oct. 2012, ISSN: 2070-1721, 77 pages. https://tools.ietf.org/html/rfc6749.
"WordPress Social Login (Facebook, Google, Twitter)", By social login (miniOrange), WordPress.org, printed Aug. 26, 2019, 9 pages. https://wordpress.org/plugins/miniorange-login-openid/.
Websequencediagrams, Website, printed Aug. 26, 2019, 1 page. https://www.websequencediagrams.com/.
Smolny et al., "Method for Authentication With Identity Providers", Application No. EP18205136.7, Filed Nov. 8, 2018.

* cited by examiner

METHOD FOR AUTHENTICATION WITH IDENTITY PROVIDERS

BACKGROUND

The present invention relates to the field of digital computer systems, and more specifically, to a method for authentication with identity providers via a federating authorization server.

A secure operation of applications in a network of web-enabled applications and APIs such as the internet environment requires at least performing authentication and authorization processes. Different infrastructures may be used for implementing such processes. For example, those processes can be implemented by different protocols such as OAuth2 and WS-Federation. The authorization process is used for access delegation, which is commonly used as a way for Internet users or resource owners to grant clients, such as websites or applications, access to their information on other websites but without giving them the passwords. The authorization process is coupled or augmented by the authentication process. For example, a federation identity system may use OAuth2 as an authorization layer that is augmented by an authentication layer such as OpenID Connect (OIDC). The combination of authentication and authorization processes may need further improvements.

SUMMARY

Various embodiments provide a method for authentication with identity providers via a federating authorization server, federating authorization server, and computer program product as described by the subject matter of the independent claims. Advantageous embodiments are described in the dependent claims. Embodiments of the present invention can be freely combined with each other if they are not mutually exclusive.

In one aspect, the invention relates to a method for an enhanced login via a federating authorization server, wherein the federating authorization server has at least one interface to at least one identity provider, each identity provider being configured to validate user identities using a respective validation method. The method comprises:
receiving login data via a webpage, the login data indicating at least an identity provider and a user;
determining the validation method of the indicated identity provider using the login data;
causing an update of the content of the webpage for enabling the determined validation method; and causing provision of identity information of the user via the updated webpage and verifying the identity information using the determined validation method.

In another aspect, the invention relates to a federating authorization server comprising at least one interface to at least one identity provider, each identity provider being configured to validate user identities using a respective validation method. The server is configured for:
receiving login data via a webpage, the login data indicating at least an identity provider and a user;
determining the validation method of the indicated identity provider using the login data;
causing an update of the content of the webpage for enabling the determined validation method; and causing provision of identity information of the user via the updated webpage and verifying the identity information using the determined validation method.

In another aspect, the invention relates to a method for a user device comprising:
rendering a webpage comprising a login form;
receiving via the webpage login data indicating at least an identity provider and a user, wherein the identity provider is configured to validate user identities using a respective validation method;
updating the content of the rendered webpage for enabling the determined validation method; and
receiving identity information of the user via the updated webpage;
providing the received identity information in accordance with validation method.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE DRAWINGS

In the following embodiments of the invention are explained in greater detail, by way of example only, making reference to the drawings in which.

DETAILED DESCRIPTION

Figure 1:
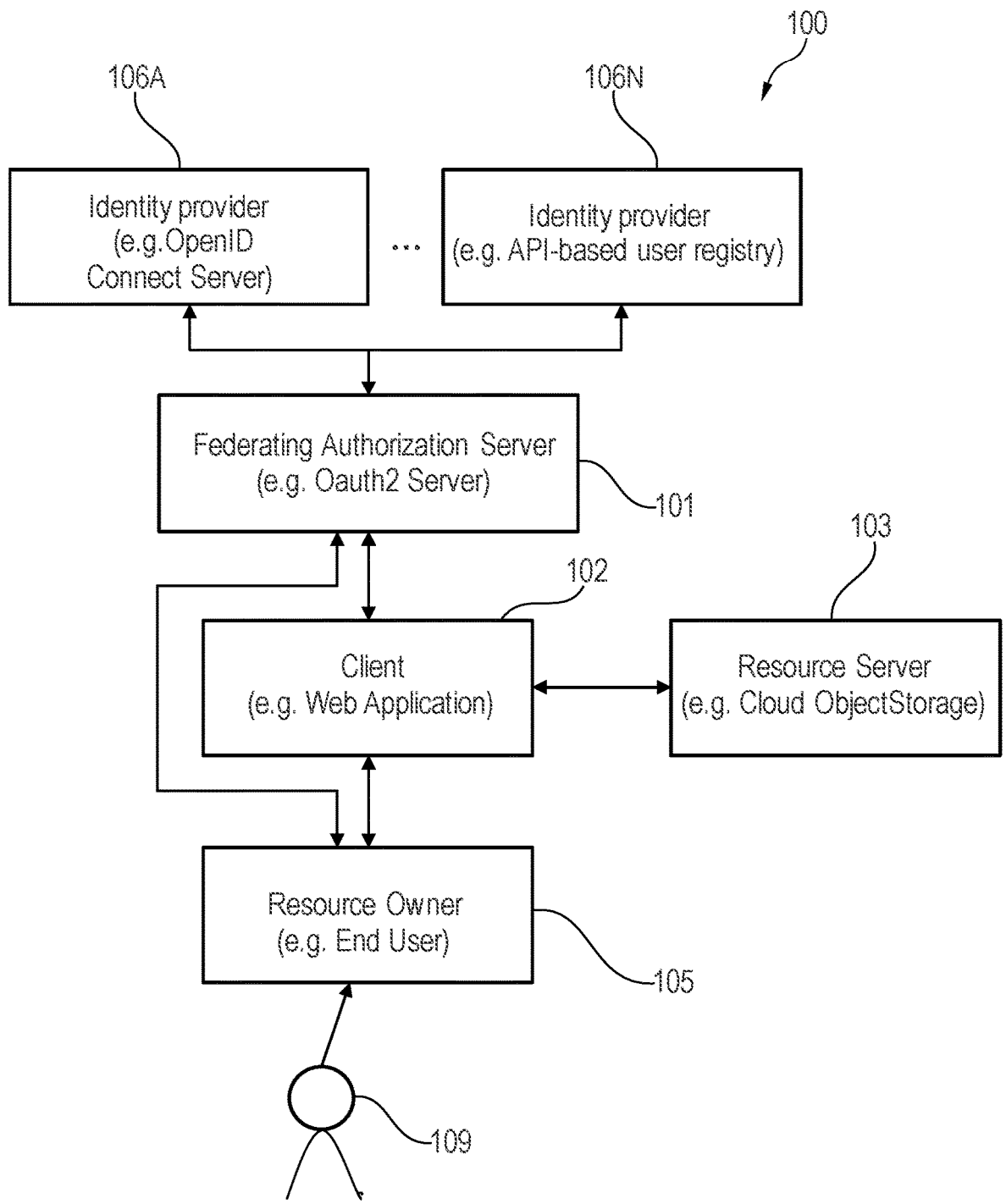
FIG. 1 depicts a block diagram representation of a computer system in accordance with an example of the present method.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accessing of user data by a given application such as a web client page may be controlled in accordance with the present disclosure. Before enabling access to the user data, at least one process may be performed e.g. an authentication process and an authorization process. Once the two processes terminate successfully, the application may access user data. The authentication process may involve one or more identity providers. The present method may improve the authentication process by enabling authentication by various types of identity providers. The present disclosure may enable a seamless integration of different types of identity providers in a transparent manner for end-users. User authentication might be performed by different identity providers. This may increase the flexibility and size of federation identity systems, as they may include higher number of and heterogeneous identity providers.

An identity provider is a system that creates, maintains, and manages identity information for principals while providing authentication services to relying party (client) applications within a federating identity system. An identity provider may be configured to provide authentication services via at least one validation method (or validation protocol or authentication protocol). For example, an identity provider may use same or different validation methods for different users. An example identity provider may be GitHub, LDAP, Facebook google, IBMID etc.

The term "webpage" refers to a document that is suitable for the World Wide Web and web browsers. A web browser displays a webpage on a monitor or mobile device. The web browser can retrieve a webpage from a remote web server. The webpage may be associated with a link e.g. URL link that is used by the web browser to retrieve the webpage from the web server. The webpage may be written in HTML or a comparable markup language. A webpage may contain numerous types of information, which is able to be seen, heard or interacted with by an end user. For example, a webpage may contain a login form. The login form may comprise fields such as username and password fields. The login form may further comprise an interface element such as a button that enables the user to request the validation or usage of the values entered in other fields of the login form.

The updating of the content of an existing webpage may comprise: using another link (redirection link) by the web browser for retrieving the updated webpage, wherein the updated webpage comprises the updated content. The updated content may comprise another login form. For example, a secondary login page is shown after the user selects by which identity provider he/she would like to be authenticated.

According to one embodiment, the method further comprises if the identity information is validated by the determined identity provider, providing, upon request, an access key or token to a web server (or client system) of the user for enabling access to one or more resource servers via the web server. For example, this embodiment may enable that after being authenticated in accordance with the present method, an OAuth2 authorization flow may start. This embodiment may enable a secure access to data even in the presence of different types of identity providers.

According to one embodiment, receiving the identity information further comprises: redirecting the identity information to the identity provider in accordance with the determined validation method; thereby enabling performing by the identity provider the verification of the identity information. For example, the identity information may not need to be sent to the federating authorization server. This may enable an alternative authentication process which may be referred to as a redirection method.

In case of the redirection method, the update of the webpage may, for example, be performed in two stages. In a first stage, the webpage is updated such that the user is shown only necessary elements or fields that he or she needs to launch the authentication process e.g. showing only the login button on the updated webpage. After launching the authentication process, another update of the webpage may be performed using a login form that is received from the selected or indicated identity provider. The user may then enter the identity information into the last updated webpage in order to be authenticated by the indicated identity provider. In another example, the identity information may be the login data e.g. the user may not need to retype again the login data in the last updated webpage.

An identity provider can support logins with username/password for some users, while for other user may require the redirection method (e.g. such as the one for OAuth2/OpenID Connect). The redirection method may be required because, for example, for a specific user requires a second authentication factor like a TOTP code may be needed, wherein the interaction involving such required information might be not exposed via API to be integrated into the client's form.

According to one embodiment, the redirecting comprises the updating of the webpage, wherein the updated webpage is another webpage of the identity provider, and receiving the identity information from the other webpage. The identity information may or may not be typed again by the user. For example, the federating authorization server may send a redirection URL to the user device and provide the username as parameter on the redirection, so the user don't need to retype it again into the other webpage.

According to one embodiment, the identity information is provided to the identity provider via the federating authentication server in accordance with the determined validation method. This may enable an alternative validation or authentication process.

According to one embodiment, the receiving of login data comprises: requesting a target webpage from a web server (or client system), receiving the webpage if the web server is authorized by the authentication federator server. The received webpage comprises a login form as provided by the federating authorization server. In addition, the login form may be configured to add a list of identity provides as follows. In other terms, the user at this stage is only shown the login form before his desired webpage is displayed. After the user is successful authenticated and the authorization process launched by the web server is successful the target webpage may be displayed to the user. The user may then use the target webpage for access resource servers' data via the web server.

According to one embodiment, the method further comprises: upon receiving the request of the webpage, sending by the web server credentials data to the federating authentication server for authentication of the web server as a truthful web server; if the web server is authenticated, receiving by the web server an authorization indicative of a time period; enabling access to the webpage during the time period. This embodiment a consistent and centralized control of access to applications e.g. this may ensure that a same client system serves in similar way different users.

According to one embodiment, the enabling access comprises providing a temporary secret that has a living duration equal to the time period. This may enable a seamless integration of this embodiment in existing systems.

According to one embodiment, the method further comprises requesting by the web server from the federating authentication server a list of identity providers; and receiving a list of identity providers in response to the request; wherein the webpage indicates the received list of identity providers, wherein the determined identity provider is a selected provider of the list. This may enable the user to choose or select the identity provider he wanted for his authentication.

FIG. 1 depicts a diagram of a federation identity system 100 in accordance with an example of the present disclosure.

The federation identity system 100 enables controlled access by users (e.g. a user 109 of user device 105) to data stored in a resource server 103. The resource server 103 may be configured to host protected resources. The resource server 103 may be configured to accept and respond to protected resource requests using access tokens.

The term "user" refers to an entity e.g., an individual, a computer, or an application executing on a computer. The user may, for example, represent a group of users. For example, a user may be a resource owner. The user device 105 may comprise an entity capable of granting or enabling access to a protected resource of the resource server 103.

The federation identity system 100 further comprises a client system 102 such as a web server. The client system 102 may provide an application such a web application, a desktop application or an application running on a different device. The application may be configured to make protected resource requests on behalf of the user device 105 and with its authorization. For example, the application may interact with a federating authorization server 101 to retrieve an access token. The client system 102 may pass the access token to the resource server 103 e.g. via an API call to execute an action or retrieve data from the resource server 103.

The federation identity system 100 further comprises the federating authorization server 101. The federating authorization server 101 may be configured to issue access tokens to the client system 102 after successfully authenticating the user 105 and obtaining authorization. The federating authorization server 101 may be the same server as the resource server 103 or a separate entity. The federating authorization server 101 may issue access tokens accepted by multiple resource servers other than the resource server 103. The federating authorization server 101 does not keep authentication information about users such as user 109. The federating authorization server 101 may store non-authentication relevant information about users. For example, as the federating authorization server 101 does not hold a user registry on its own, it may delegate authentication and authorization operations to one of multiple identity providers 106A-N that can validate users' identities. This delegation may be based on standard protocols like OAuth2, OpenID Connect, LDAP, but also on proprietary implementations that expose authentication via APIs. Thus, authentication requests received at the federating authorization server 101 are forwarded to one or more identity providers 106A-N of the computer system 100. Each of the identity providers 106A-N may be configured to authenticate and authorize users. The identity providers 106A-N can be used as "back-end" for the federating authorization server 101.

Each of the identity providers 106A-N may be configured to validate users' identities using a one or more validation methods or protocols. For example, a validation method may require that the identity provider does the validation exclusively without going through the federating authorization server 101. This validation method may be referred to as redirection method. In another example, a validation method (e.g. OIDC protocol) may require that the validation is performed such that authentication data pass via the federating authorization server 101.

In one example, in order to keep confidence of the resource owner 109, the client system 102 may have a predefined minimum confidence level as required by the resource owner. This may for example be implemented by requiring that the client system 102 and the federating authorization server are provided by the same source, and the endpoint of the client system 102 and the federating authorization server 101 have a clear relation to each other, e.g. "https://app.company.com" may be associated with the client system 102 and "https://login.company.com" may be associated with the federating authorization server 101. This may, for example, enable that the federating authorization server 101 has a special authorization setting on the client identifier of the client system 102.

Figure 2:
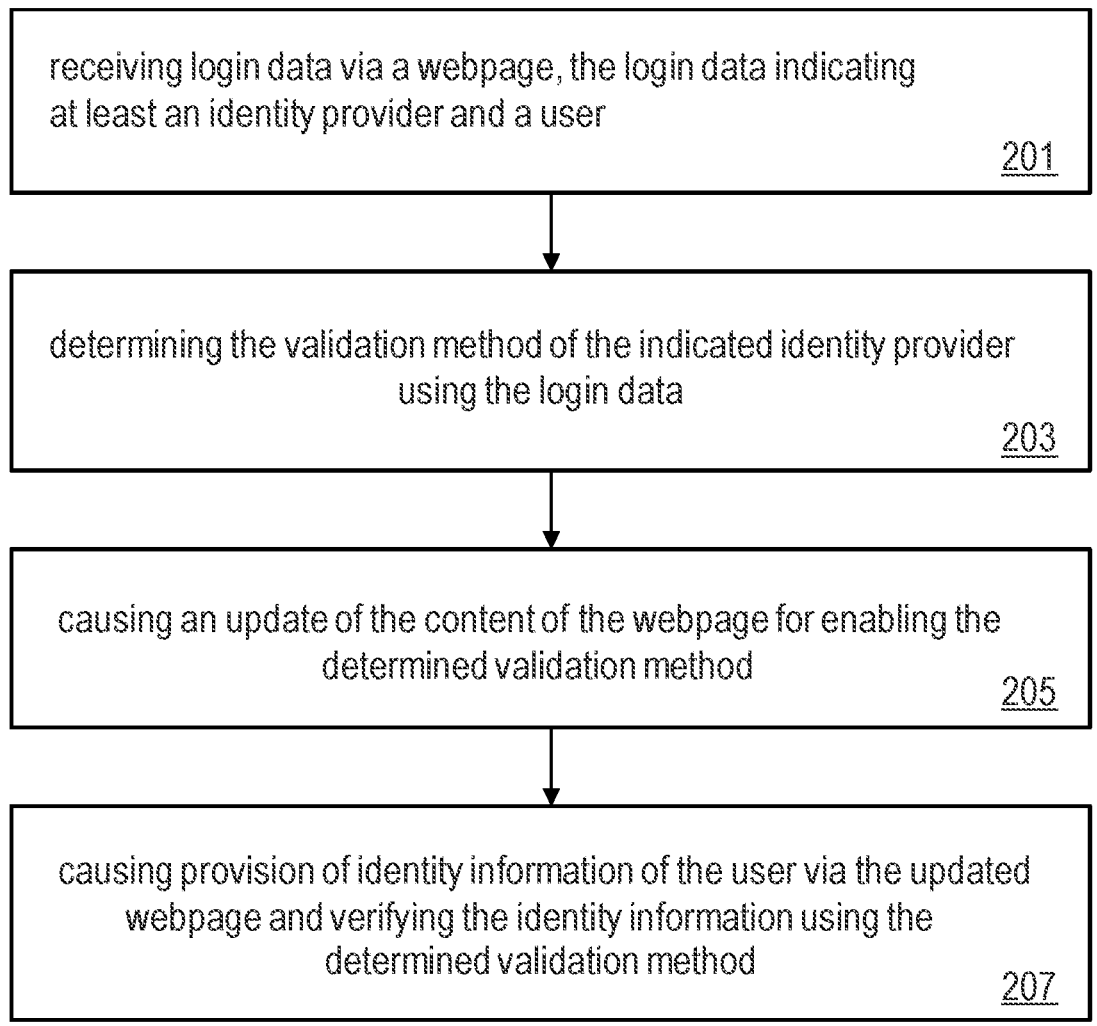
FIG. 2 is a flowchart of a method for authentication with identity providers via a federating authorization server.

FIG. 2 is a flowchart of a method for authentication with identity providers via a federating authorization server e.g. 101.

In step 201, the federating authorization server 101 may receive login data via a first webpage e.g. displayed on the user device 105. The login data indicates at least an identity provider 106A-N and a user 109.

For example, the user 109 may open a browser at the user device 105 for searching or requesting a target webpage of the client system 102. The webpage request may be received at the client system 102 e.g. being a web server. Upon receiving the webpage request, the client system 102 may authenticate and request an authorization from the federating authorization server 101 in order to be able to provide the requested webpage to the user device 105. Upon receiving an authorization from the federating authorization server 101, the client system 102 may generate a login form that can be used to authenticate the user 109 and the first webpage may be rendered on the user device 105. The user 109 may then see the first webpage comprising the login form only (e.g. the user 109 does not see yet his target webpage). The login form may for example comprise a username field, a password filed and a login button. Before or optionally after rendering the first webpage, the user device 105 may for example further request a list of identity providers 106A-N from the federating authorization server 101 and may receive it. The user device 105 may configure the content of the first webpage such that, the rendered first webpage may include the login form and the list e.g. the list may be provided as List boxes (e.g. checkboxes) on the first webpage to allow the user 109 to select, at a time, one or more items of the identity providers 106A-N.

The user 109 may enter the login data into the rendered first webpage. The login data may comprise at least a selection of a identity provider 106A (e.g. whose checkbox is ticked) of the identity providers 106A-N and a username of the user 109. The user 109 may not need to enter a password at this stage. The user 109 may click on the login button to launch an authentication or validation of the entered values of the username field via the selected identity provider.

In step 203, the federating authorization server 101 may determine the validation method of the selected identity provider 106A using the login data. For example, the federating authorization server 101 may communicate the username to the selected identity provider 106A an request which kind of validation method is to be used for the communicated username. The federating authorization server 101 may then receive an indication of the validation method that would be used for the communicated username. The federating authorization server 101 may cause the update of the content of the first webpage and the provision or entry of identity information of the user 109 via the updated first webpage.

In step 205, the federating authorization server 101 may cause the user device 105 to update the content of the first webpage for enabling the determined validation method in step 203. For example, the user device 105 may receive from the federating authorization server 101 a redirect message which may trigger the update of the content of the first webpage. The redirect message may comprise a redirection URL and one or more instructions. The user device may use the received instructions and the redirection URL to change or update the content of the first webpage. Depending on the validation methods, the first webpage may for example be updated such as to hide the password field of the login form and to configure the logic behind the login button such that when the login button is clicked the determined validation method is launched or triggered by redirecting the content of the web browser to the redirection URL. After launching the determined validation method, the first webpage may further be updated to include a login form that may be required by the determined validation method. This may particularly be advantageous if the user information entered in the first webpage before being updated or after being updated may not be sufficient or different from information required by the determined validation method and the selected identity provider.

In step 207, the federating authorization server 101 may further cause the provision of identity information of the user 109 via the updated first webpage. For example, the display of the updated content of the first webpage (which is triggered or caused by the federating authorization server 101) may trigger or prompt the user to enter the identity information. This may enable verification of the identity information by the selected identity provider 106A using the determined validation method. In another example, the login data of step 201 may be used as the identity information for step 207. For example, provide the username as parameter on the redirect message, so the user 109 does not need to retype it again into the updated first webpage. This may enable an efficient and transparent access for the user 109.

Steps 201-207 may enable an authentication process in accordance with the present disclosure. After that authentication process is successful (e.g. the user is authenticated in accordance with the determined validation method), an authorization process may start as known in order to display the target webpage. The target webpage may then be used by the user 109 to access data in one or more resource servers via the client system 102. For example, the federating authorization server 101 may provide after successful authentication, and upon request e.g. of the client system 102, an access key to the user device 105 for enabling access to the resource server 103.

FIGS. 3A-3E are flow diagrams for a method according to the present disclosure. The method described with reference to FIGS. 3A-3E may comprise an interaction pattern which may be called "external flow" in accordance with the present disclosure. In these flow diagrams, the user 109 may be a resource owner user and the user device 105 may be a resource owner user agent.

The flow diagrams describe different phases for the interaction between elements of the federated identity system 100 such as between the client system 102 and the federating authorization server 101. For example, to successfully render a login form, interact with the federating authorization server 101 and finally being able to get an access token for the resource owner 109, three interaction phases may be processed.

Figure 3A:
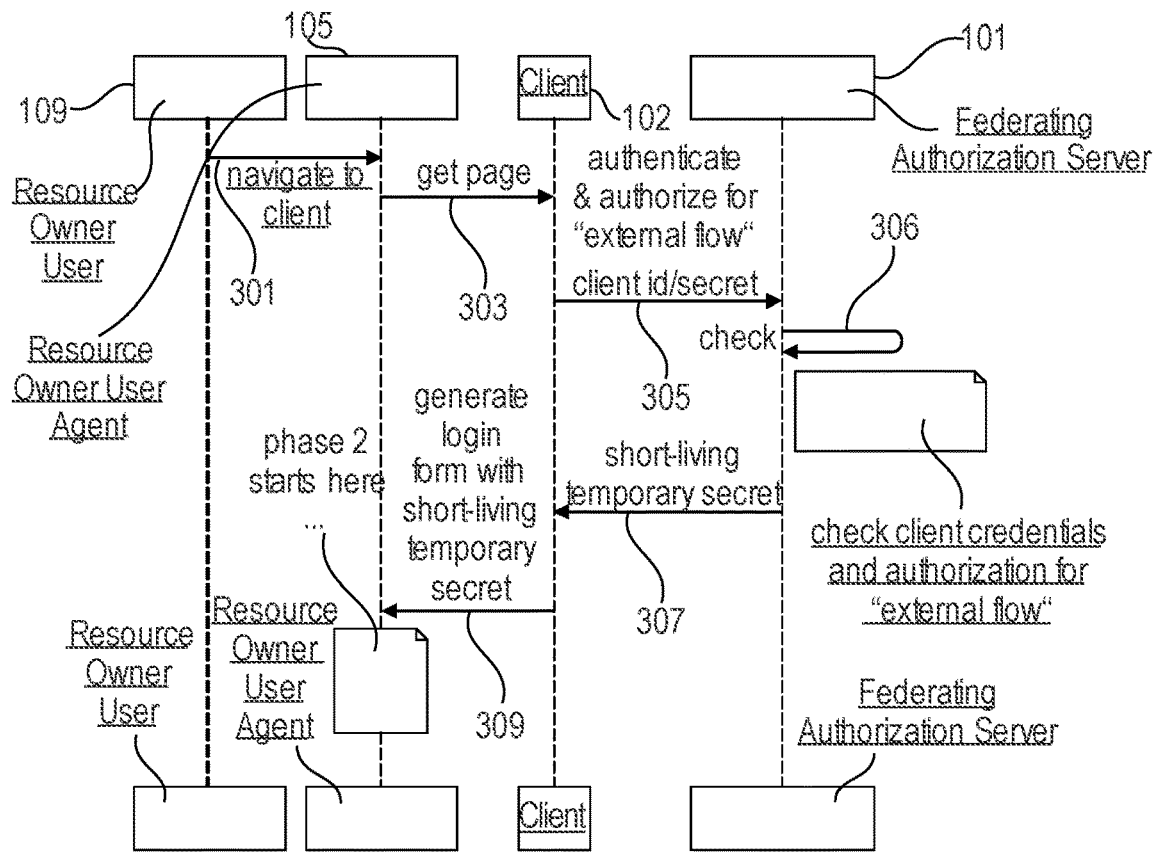
FIG. 3A is a flow diagram describing a first interaction phase to authenticate a client system.
Figure 3B:
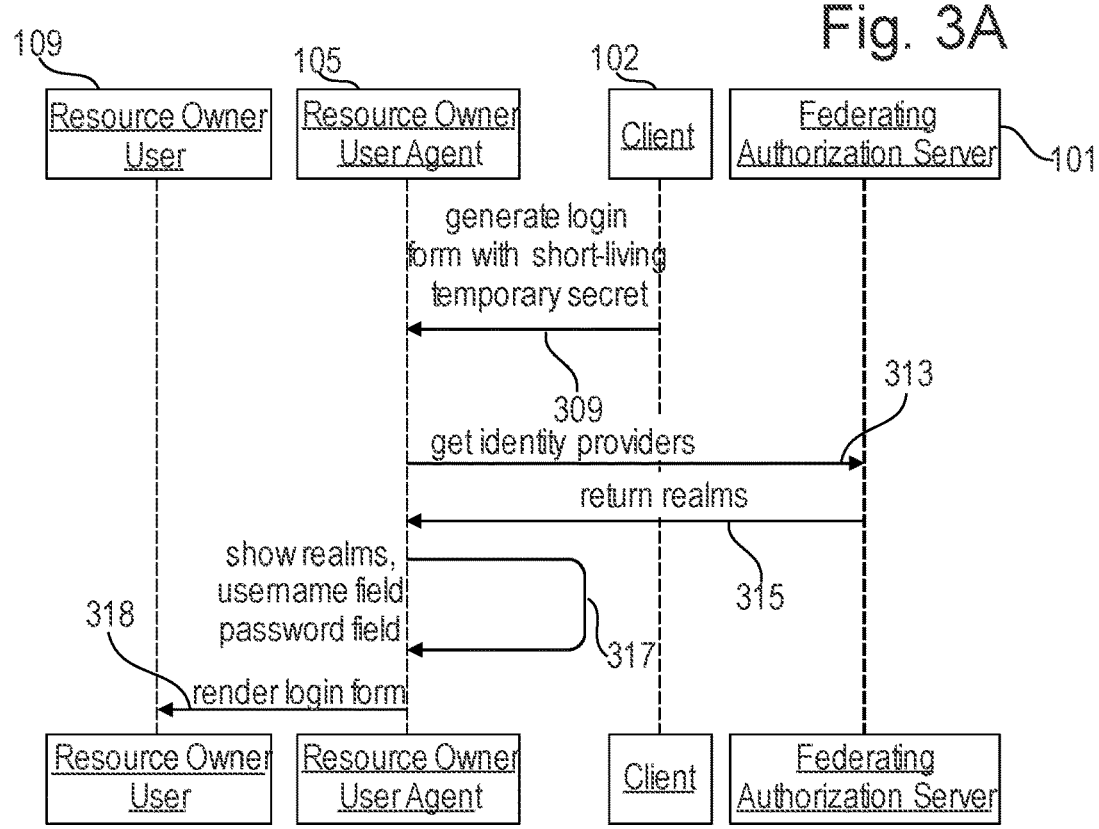
FIG. 3B is a flow diagram for a method for an initial display of a webpage.
Figure 3C:
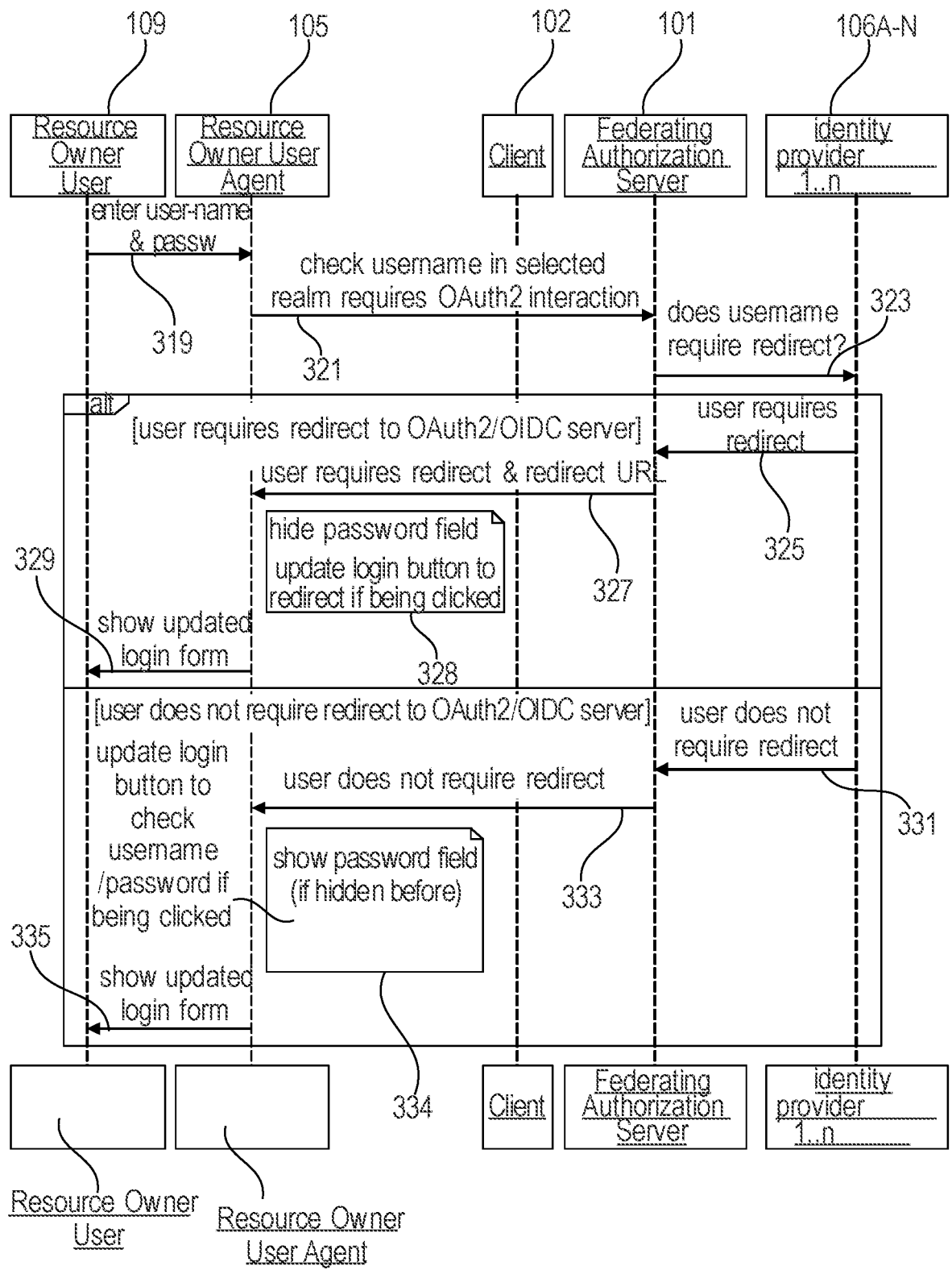
FIG. 3C is a flow diagram for a method for interaction of a user with the displayed webpage.
Figure 3D:
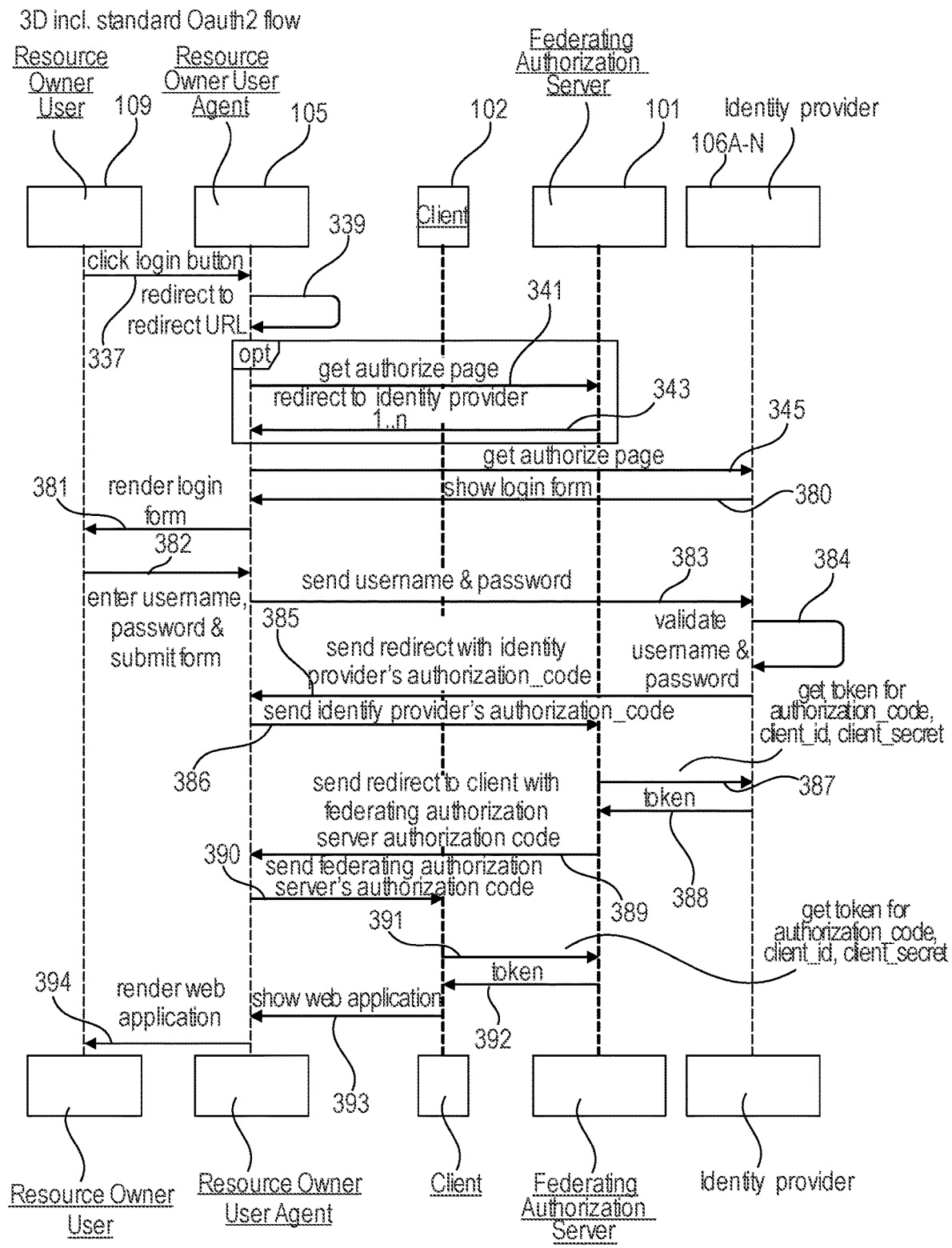
FIG. 3D is a flow diagram for a method for authenticating the user in accordance with a validation method.
Figure 3E:
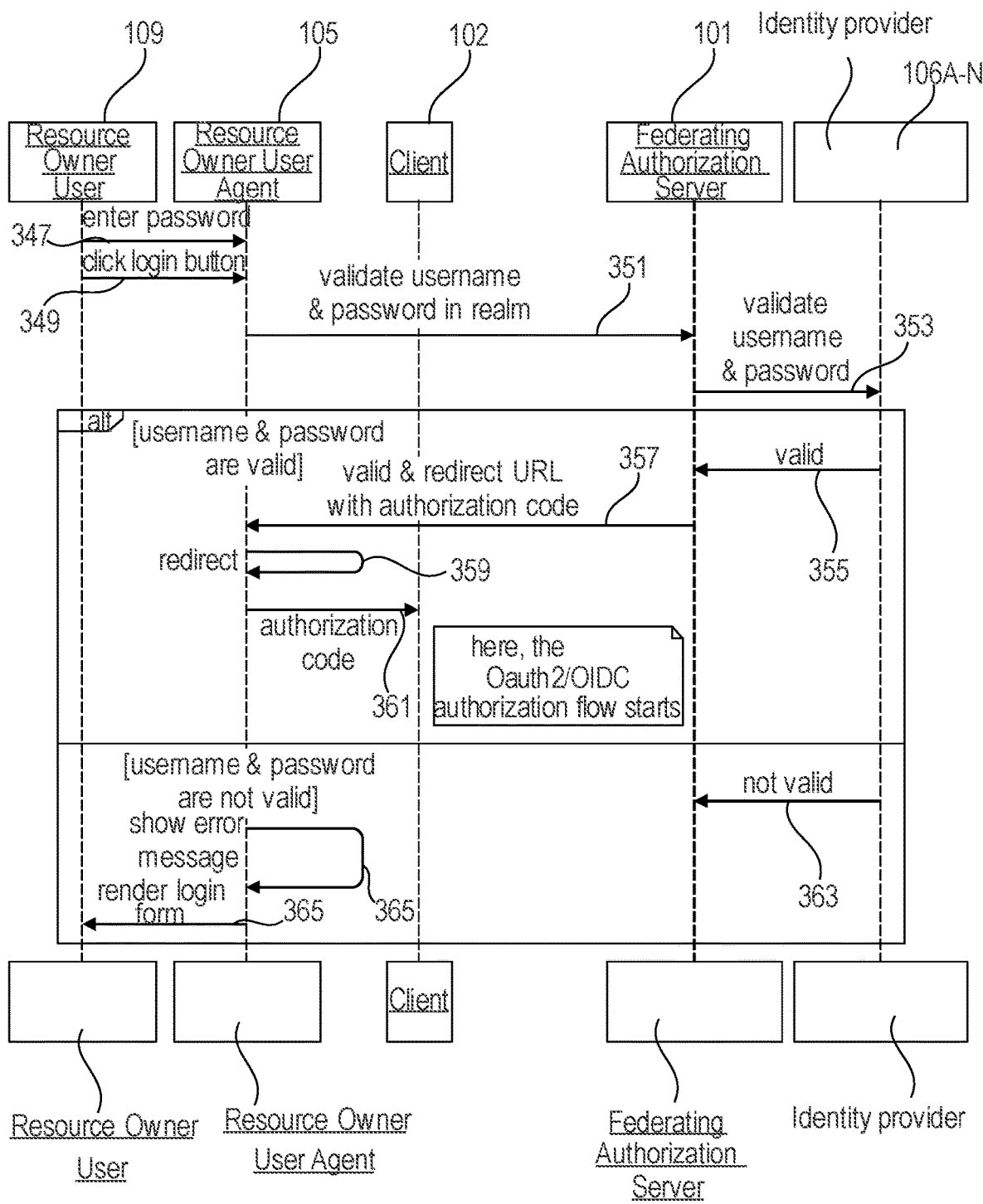
FIG. 3E is a flow diagram for a method for authenticating the user in accordance with another validation method.

FIG. 3A describes a first interaction phase e.g. an initializing phase, to authenticate the client system 102 in order that the client system 102 can render the login form. FIGS. 3B and 3C describe the second interaction phase. The second interaction phase involves and interaction with the login form. For example, user 109 interacts via client system's login form with the federating authorization server 101 to provide username, password, and a selection criterion which identity provider 106A-N should be used for authentication. FIGS. 3D and 3E describe the third phase. The third phase may be an authentication phase involving an authentication and authorization by the federated and identity providers.

FIG. 3A is a flow diagram for requesting a webpage by the user device 105. The diagram of FIG. 3A involves API interactions of this first phase which happen between the client system's server-side code and the federating authorization server 101. Using the client system's server-side may be advantageous because pre-shared credentials such as client id and client secret may need to be presented. Thus, they may be kept secret on the server and are not sent to a client-side (e.g. web browser).

In step 301, the user 109 may navigate to client system 102 via the user device 105. For example, the user 109 may open a browser on the user device 105 and may request a webpage of the client system 102. And, the user device 105 may request the webpage via a "get page" request in step 303 from the client system 102.

Upon receiving the request of the webpage, the client system 102 may authenticate itself with the federating authorization server 101 in order to be authenticated and authorized to provide the requested webpage to the user device 105 in accordance with the external flow. For that, the client system 105 may send credential data in step 305 to the federating authorization server 101. The credential data may comprise a client ID of the client system 102 and a secret.

Upon receiving the credential data, the federating authorization server 101 may check the credential data and may or may not authorize the client system 102. In this example, the client system 102 is authorized. In step 307, the federating authorization server 101 may send a short-living temporary secret to the client system 102. In step 309, the client system 102 may generate a login form with the received short-living temporary secret. After generating the login form, the second interaction phase may be performed as indicated in FIG. 3A.

FIG. 3B is a flow diagram for a method for an initial display of the webpage.

The user device 105 may request in step 313 a list of identity providers 106A-N from the federating authorization server 101. In response to the request of that list, the federating authorization server 101 may return in step 315 a list of identity providers to which it may interface. This is referred to in the diagram as returning realms. The user device 105 may then configure in step 317 the provided webpage with received realms e.g. in addition to the username and password fields of the login form. The login form may further comprise a login button that is configured when clicked to access a given URL in order to perform a given method. The resulting webpage may be rendered in step 318 e.g. on the browser of the user device 105.

FIG. 3C is a flow diagram for a method for interaction of the user 109 with the displayed webpage.

In step 319, the user 109 may for example enter the username and the password in the corresponding fields of the webpage. In addition, the user 109 may select one or more identity providers that are listed or displayed on the webpage.

In step 321, the user device 105 may request the federating authorization server 101 for a check of which validation method the selected identity provider is to use for the username (e.g. checking whether the username requires OAuth2 interaction). In response to step 321, the federating authorization server 101 may send in step 323 a request to the selected identity provider for requesting which validation method is to be used for the username e.g. the federating authorization server 101 may request if the redirection method may be used.

If, in a first case, the redirection method is to be used, the selected identity provider may send in step 325 to the federating authorization server 101 first data indicating that the user 109 requires the redirection method. In response to receiving that first data, the federating authorization server 101 may send in step 327 second data to the user device 105. The second data indicates that the user 109 requires the redirection method and comprises a redirection URL. Upon receiving the second data, the user device 105 may update in step 328 the webpage. The webpage may for example be updated to hide the password field and to configure the login button to use the received redirection URL. In step 329, the user device may show (e.g. on the browser) the updated webpage.

If, in a second case, the redirection method is to not be used, the selected identity provider may send in step 331 to the federating authorization server 101 third data indicating that the user 109 does not require the redirection method. In response to receiving that third data, the federating authorization server 101 may send in step 333 fourth data to the user device 105. The fourth data indicates that the user 109 does not require the redirection method. Upon receiving the fourth data, the user device 105 may update in step 334 the webpage. The webpage may for example be updated to show the password field if it is hidden before and to configure the login button to check username and password if the login button is clicked. In step 335, the user device may show (e.g. on the browser) the updated webpage.

FIG. 3D is a flow diagram for a method for authenticating the user 109 in the first case (involving the redirection method) described in FIG. 3C. In this example, the user 109 may need to be authenticated in accordance with a redirection method of an identity provider such as an OIDC server.

After the updated webpage is shown in step 329, the user 109 may click in step 337 on the login button of the updated webpage. Since this is the first case, the click on the login button may trigger in step 339 a redirection by the user device 105 to the received redirection URL of step 327. In step 341, the user device 105 may request an authorize page from the federating authorization server 101. The federating authorization server 101 may send in step 343 an indication that a redirection to the selected identity provider is required. The user device 105 may request (e.g. in response to receiving that indication) the authorize page from the selected identity provider in step 345. In response to the request of the authorize page, the selected identity provider may send in step 380 a login form or instructions to show the login form to the user device 105. The login form may be rendered in step 381 on the web browser of the user device resulting in another update of the webpage. The user 109 may then enter in step 382 identity information such as username and password as required by the login form and may submit the filled form. This may trigger the user device 105 to send the identity information to the selected identity provider in step 383. The selected identity provider may verify the identity information in step 384 and may validate that identity information if the user 109 is authenticated. If the identity information is validated, the selected identity provider may send in step 385 a redirect message indicative of an authorization code of the selected identity provider. In step 386, the user device 105 may send the received authorization code to the federating authorization server 101 (e.g. as an indication that the user 109 is authenticated). In response to receiving the authorization code from the user device 105, the federating authorization server 101 may send a request in step 387 to the selected identity provider for a token for the authorization code and client information of the client system 102 such as client ID and client secret. In response to the request, the federating authorization server 101 may receive from the selected identity provider in step 388 a token. Upon receiving the token, the federating authorization server 101 may send in step 389 a redirect message to the user device 105 indicating a federating authorization server's authorization code. The user device 105 may send in step 390 to the client system 102 the federating authorization server's authorization code as an indication that the user 109 is successfully authenticated in accordance with the authentication process of the present disclosure. After a successful authentication of the user 109, an authorization process may begin (e.g. in accordance with OAuth2/OIDC). For example, the client system 102 may request from the federating authorization server 101 in step 391 an access token for the received federating authorization server's authorization code and for the client information. The client system 102 may receive from the federating authorization server 101 in step 392 the requested access token. In step 393, the client system 102 may enable the user device to show the (target) webpage of the client system. The user device 105 may render the webpage of the client system 102 for the user 109 in step 394. Steps 391-394 may be steps of the authorization process.

FIG. 3D provides an example authentication process (steps 337-390) in accordance with the present disclosure in case a redirection method (validation method) is to be used for the user 109. Steps 341 and 342 may be optional steps in the authentication process. For example, the method of FIG. 3D may comprise steps 337-339 and steps 345 to 394. In another example, the method of FIG. 3D may comprise steps 337 to 394.

FIG. 3E is a flow diagram for a method for authenticating the user 109 in the second case described in FIG. 3C. For example, the user 109 may not require a redirection as described in FIG. 3D.

After the updated webpage is shown in step 335, the user 109 may enter a password in the password field in step 347 and may further click in step 349 on the login button of the updated webpage. Since this is the second case, the click on the login button may cause the user device 105 to send in step 351 a request to the federating authorization server 101 for validating login data of the user 109. The login data may comprise the username and the password. Upon receiving that request, the federating authorization server 101 may forward that request to the selected identity provider in step 353.

If the login data of the user 109 is validated by the selected identity provider, the selected identity provider may send in step 355 data to the federating authorization server 101 indicating that the login data is valid. The federating authorization server 101 may thus send another data to the user device 105, wherein the other data indicate that the login data is valid and comprise another redirection URL and an authorization code. In step 359, the user device may perform a redirection to the other redirection URL for sending the authorization code via the other redirection URL to the client system 102 in step 361. After a successful authentication of the user 109 (e.g. after steps 347-361 are performed), an authorization process may begin e.g. in accordance with OAuth2/OIDC as indicated in the diagram of FIG. 3E. The authorization process may for example comprise steps 391-394.

If the login data of the user 109 is not validated by the selected identity provider, the selected identity provider may send in step 363 an indication to the federating authorization server 101 for indicating that the login data is not valid. This may trigger the user device 105 to show an error message and to render it in the webpage in step 365.

Figure 4:
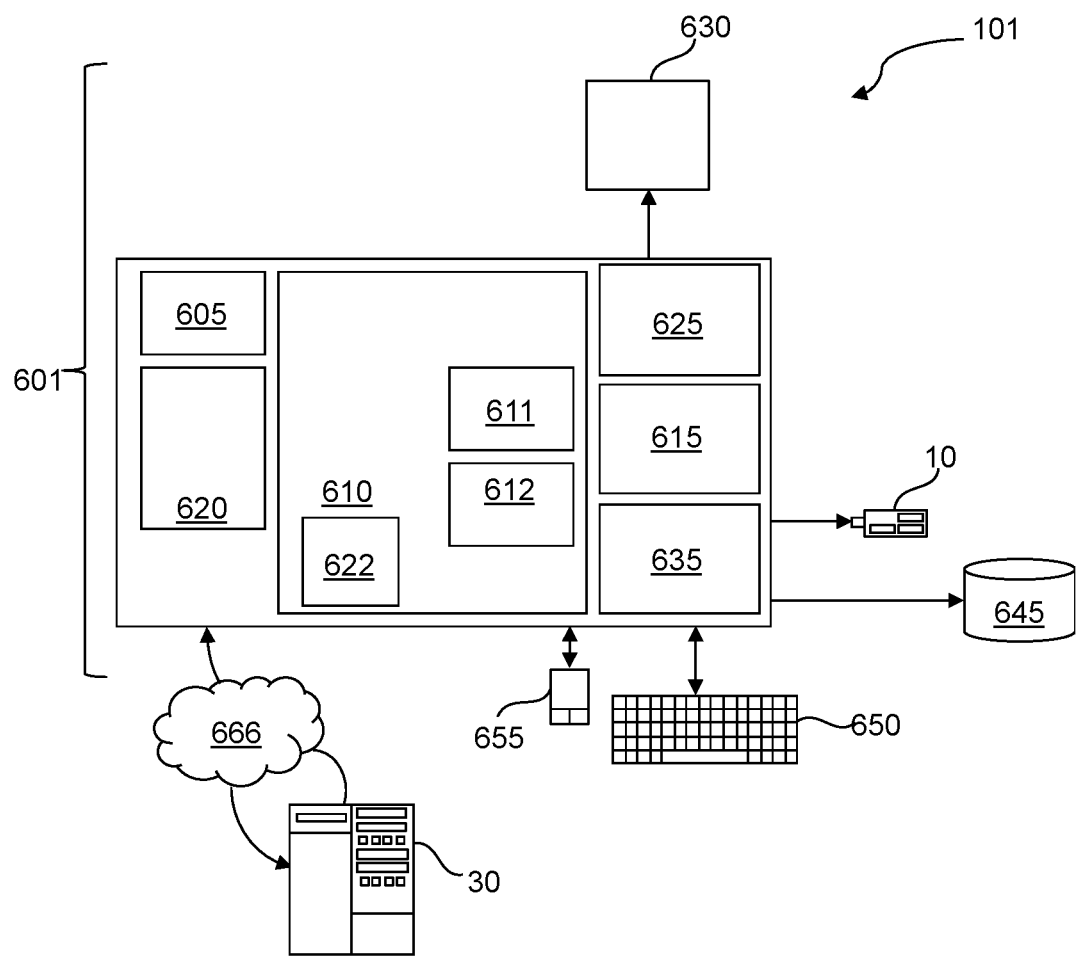
FIG. 4 represents a computerized system, suited for implementing one or more method steps as involved in the present disclosure.

FIG. 4 depicts an example hardware implementation of federating authorization server 101 (or user device 105). FIG. 4 represents a general computerized system, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 101 therefore includes a general-purpose computer 601.

In exemplary embodiments, in terms of hardware architecture, as shown in FIG. 4, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 101 can further include a display controller 625 coupled to a display 630. In exemplary embodiments, the system 101 can further include a network interface for coupling to a network 666. The network 666 can be an IP-based network for communication between the computer 601 and any external server, client and the like via a broadband connection. The network 666 transmits and receives data between the computer 601 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software, as is shown in FIG. 4, the methods can be stored on any computer readable medium, such as storage 620, for use by or in connection with any computer related system or method. The storage 620 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for authentication with identity providers via a federating authorization server, wherein the federating authorization server has at least one interface to at least one identity provider, each identity provider being configured to validate user identities using one or more validation methods, the method comprising:
  receiving login data via a login form of a webpage, the login data indicating at least an identity provider and a user;
  determining the validation method of the indicated identity provider for the indicated user using the login data;
  causing an update of the content of the webpage for enabling the determined validation method, the update including modifying the login form, wherein modifying the login form includes modifying an interface element to cause a redirection, when selected, to the indicated identity provider in accordance with the determined validation method; and
  causing provision of identity information of the user via the updated webpage and verifying the identity information using the determined validation method.

2. The method of claim 1, further comprising in response to the identity information being validated by the indicated identity provider, providing, upon request, an access key to a web server of the user for enabling access to one or more resource servers via the web server.

3. The method of claim 1, wherein the redirection comprises retrieving another webpage of the indicated identity provider, and wherein the provision of the identity information is from the other webpage.

4. The method of claim 1, wherein the identity information is provided to the indicated identity provider via the federating authorization server in accordance with the determined validation method.

5. The method of claim 1, wherein the receiving of login data comprises: requesting a target webpage from a web server, receiving the webpage if the web server is authorized by the federating authorization server.

6. The method of claim 5, further comprising:
  upon receiving the request of the target webpage, sending by the web server credentials data to the federating authorization server for authentication of the web server as a truthful web server;
  in response to the web server being authenticated, receiving by the web server an authorization indicative of a time period; and
  enabling access to the webpage during the time period.

7. The method of claim 6, wherein the enabling access comprises providing a temporary secret that has a living duration equal to the time period.

8. The method of claim 6, further comprising requesting by the web server from the federating authorization server a list of identity providers; and receiving a list of identity providers in response to the request, wherein the webpage indicates the received list of the plurality of identity providers, and wherein the indicated identity provider is a selected provider of the list.

9. A computer program product comprising a computer-readable storage medium having computer-readable program code embodied therewith, the computer-readable program code executable by a processor to perform a method comprising:
  receiving login data via a login form of a webpage, the login data indicating at least an identity provider and a user;
  determining the validation method of the indicated identity provider for the indicated user using the login data;
  causing an update of the content of the webpage for enabling the determined validation method, the update including modifying the login form, wherein modifying the login form includes changing an interface element to cause a redirection, when selected, to the indicated identity provider in accordance with the determined validation method; and
  causing provision of identity information of the user via the updated webpage and verifying the identity information using the determined validation method.

10. The computer program product of claim 9, wherein the method further comprises in response to the identity information being validated by the indicated identity provider, providing, upon request, an access key to a web server of the user for enabling access to one or more resource servers via the web server.

11. The computer program product of claim 9, wherein the redirection comprises retrieving another webpage of the selected identity provider, and wherein the provision of the identity information is from the other webpage.

12. The computer program product of claim 9, wherein the identity information is provided to the indicated identity provider via the federating authentication server in accordance with the determined validation method.

13. The computer program product of claim 9, wherein the receiving of login data comprises: requesting a target webpage from a web server, receiving the webpage if the web server is authorized by the federating authorization server.

14. The computer program product of claim 13, wherein the method further comprises:
  upon receiving the request of the target webpage, sending by the web server credentials data to the federating authorization server for authentication of the web server as a truthful web server;
  in response to the web server being authenticated, receiving by the web server an authorization indicative of a time period; and
  enabling access to the webpage during the time period.

15. The computer program product of claim 14, wherein the enabling access comprises providing a temporary secret that has a living duration equal to the time period.

16. The computer program product of claim 14, wherein the method further comprises requesting by the web server from the federating authorization server a list of identity providers; and receiving a list of identity providers in response to the request, wherein the webpage indicates the received list of the plurality of identity providers, and wherein the indicated identity provider is a selected provider of the list.

17. A federating authorization server comprising at least one interface to at least one identity provider, each identity provider being configured to validate user identities using one or more validation methods, the server comprising a memory and a processor configured to execute program instructions stored in the memory to perform operations comprising:
    receiving login data via a login form of a webpage, the login data indicating at least an identity provider and a user;
    determining the validation method of the indicated identity provider for the indicated user using the login data;
    causing an update of the content of the webpage for enabling the determined validation method, the update including modifying the login form, wherein modifying the login form includes changing an interface element to cause a redirection, when selected, to the indicated identity provider in accordance with the determined validation method; and
    causing provision of identity information of the user via the updated webpage and verifying the identity information using the determined validation method.

18. The method of claim 1, wherein modifying the login form includes showing an additional field in the login form.

\* \* \* \* \*